Nov. 30, 1937.  R. CHILTON  2,100,632
TRANSMISSION
Filed Feb. 27, 1936  2 Sheets-Sheet 1
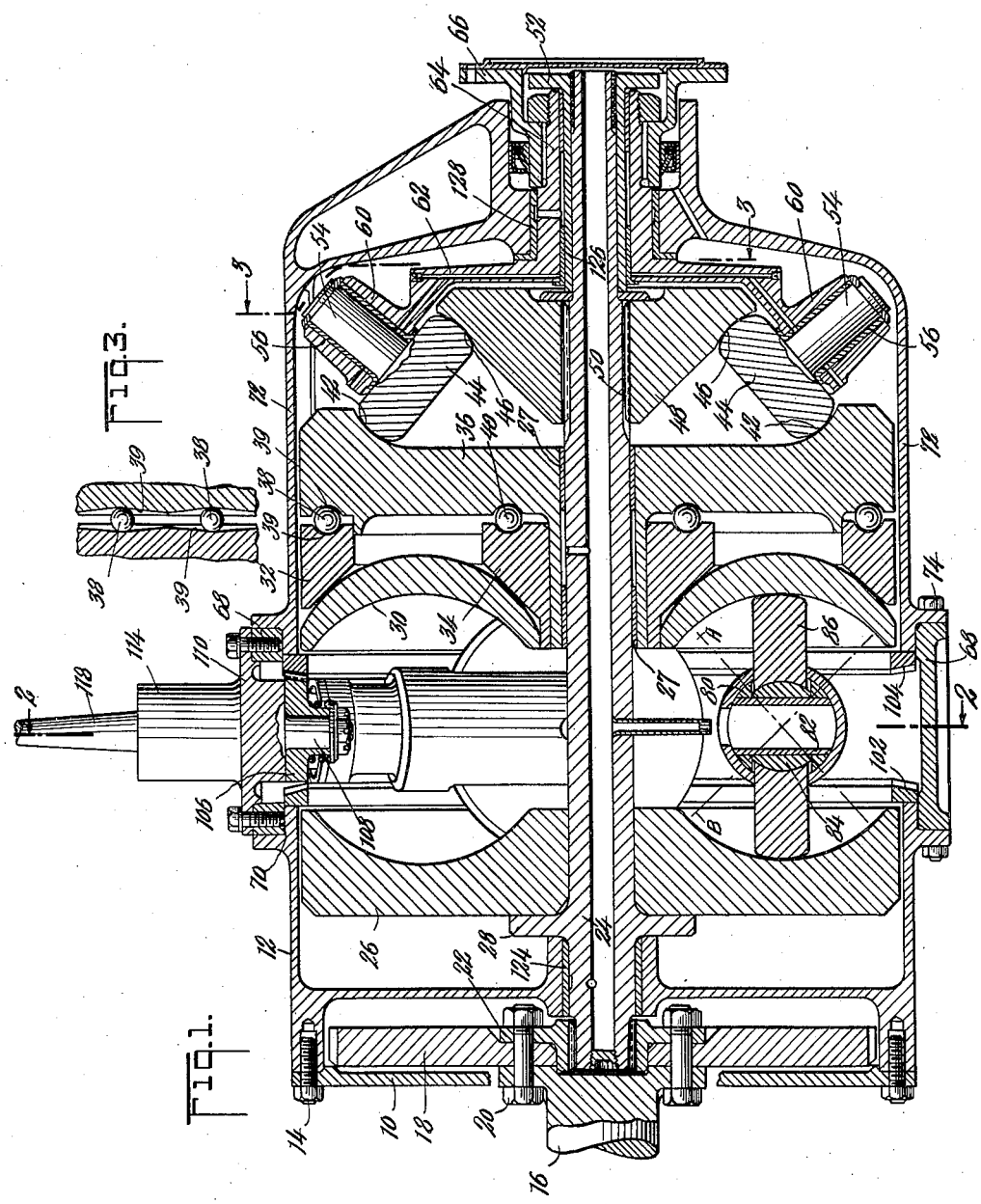
INVENTOR
ROLAND CHILTON
BY
ATTORNEY

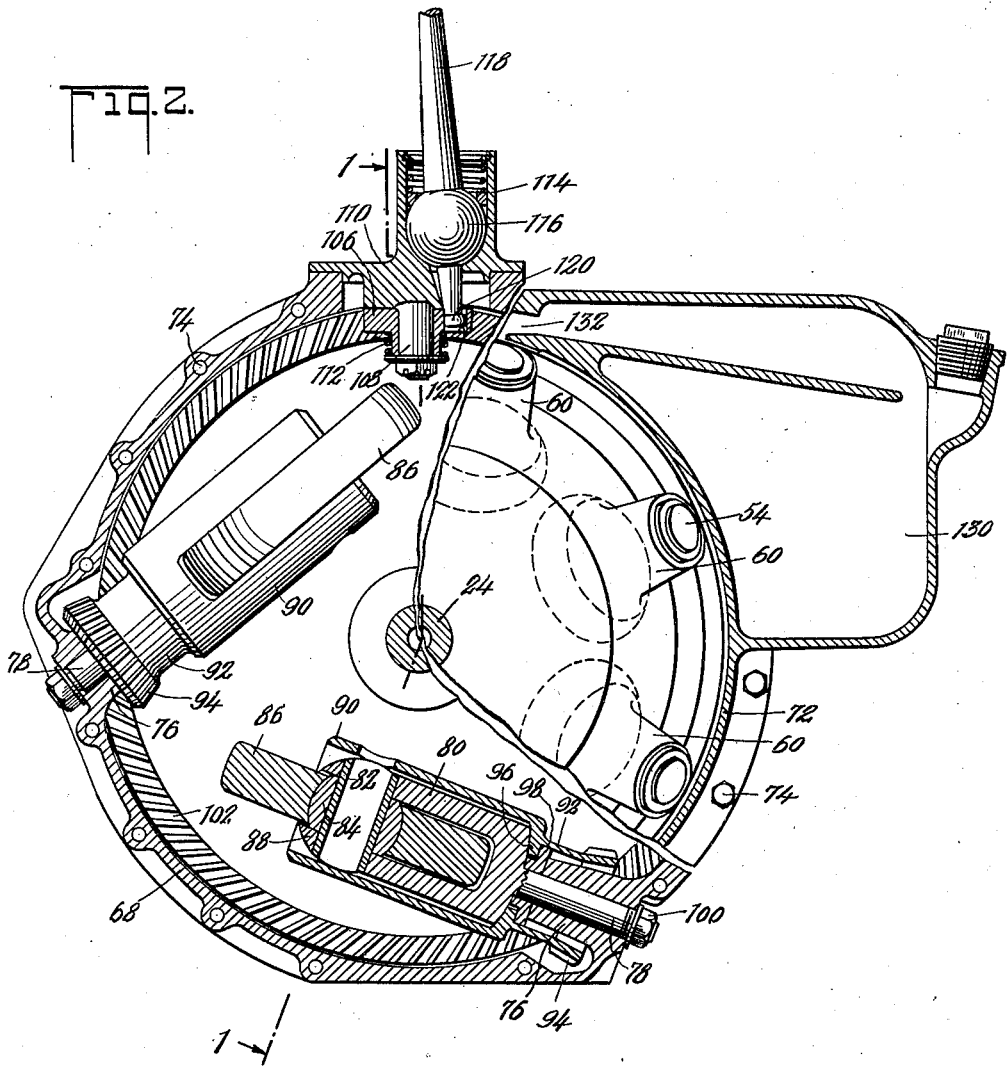

Patented Nov. 30, 1937

2,100,632

UNITED STATES PATENT OFFICE 2,100,632

TRANSMISSION

Roland Chilton, Ridgewood, N. J.

Application February 27, 1936, Serial No. 65,975

14 Claims. (Cl. 74—281)

This invention relates to transmissions, and in certain aspects comprises a continuing development of that type of transmission described and illustrated in application Serial No. 65,794, filed concurrently herewith.

Application Serial No. 65,794, refers to a type of transmission wherein opposed toroidal discs are contacted at varying radii by connecting rollers, and teaches novel hydraulic means for maintaining the contact loads proportional to the driving effort at the contacts, despite the change in radii thereof. The present invention includes novel and simplified mechanical means for the same purpose.

The above identified application also shows how planetary gears between the driving and driven members may be used to obtain zero and reverse drive ratios at a planet carrier, with a variable speed organization in itself incapable of reaching zero ratio. The present invention shows how rollers may be substituted for the planetary gears and be utilized to the elimination of the ball thrust bearings often used in transmissions of this type in the prior art.

Another object of the invention is to provide simplified roller control and support structures whereby economies in weight, bulk and cost may be achieved.

Other objects of the invention will be obvious from, or will be pointed out in the following description, with reference to the drawings, in which:

Fig. 1 is a longitudinal axial section on the line 1—1 of Fig. 2;

Fig. 2 is an end view, the left hand portion of which is in section on the line 2—2 of Fig. 1, with one of the roller elements shown in outside view, and with the right hand portion in section on the line 3—3 of Fig. 1; and Fig. 3 is a developed diagram of a torque-responsive device.

Referring first to Fig. 1, 10 designates a conventional engine back plate to which a transmission front housing 12 is secured by studs 14. A conventional engine crankshaft 16 carries the usual flywheel 18, secured by bolts 20, which also attach a driving hub 22, into which is splined a main or driving shaft 24 on which is rigidly mounted a toroidal faced driving disc 26 backed up and driven by a shaft flange 28. In opposition to the driving disc 26 there is mounted for free rotation on the main shaft 24 on bushings 27 a driven assemblage comprising an arcuate driven disc 30 backed up by an outer torque-responsive ring 32 and an inner torque-responsive ring 34 which are in turn backed up by a heavy disc 36 through balls 38 and 40 engaging similar inclined pockets or tracks 39 (Fig. 3) formed in the members 32, 34, 36 to comprise duplex torque-responsive contact loading means effective at the inner and outer peripheries, respectively, of the driven disc 30.

The outer rear face of the heavy disc 36 comprises a race-way 42 engaged by rollers 44 engaging a companion race-way 46 on a member 48, splined at 50 for rotation with the drive shaft 24 and backed up thereon by the sleeve nut 52. The rollers 44 have journals 54 rotatable in bushings 56 in bosses 60 of the driven member 62 provided with a sleeve extension 64 on which is splined a coupling flange 66.

An intermediate transmission housing 68 is piloted at 70 onto the front housing 12 and carries in turn a rear housing 72, these parts being secured together by bolts 74. The intermediate housing 68 has tangential bosses 76, in which are rotatable shanks 78, of roller-carrying forks 80, having tubular spindles 82, comprising journals for spherical bushings 84, on which rollers 86 are mounted for slight tilting in, and for ratio changing rotation or precession with the carrying forks 80 upon their shanks 78.

The forks 80 have spherical enlargements 88 at the roller axes engaged by tubular control forks 90 fitting the sides of the rollers and integral with sleeve portions 92 and with hypoid control pinions 94. The control forks 90 have each a spherical internal flange 96 engaging companion shoulders on the forks 80 and on thrust washers 98, these parts being adjusted to the desired axial working clearance by nuts 100 on the shanks 78. It will be noted that the control member 90, 92, 94, 96 has radial clearances internally whereby it is free to tilt about the sphere 88, upon the associated fork 80.

Engaged with the hypoid pinions 94 are opposed similar hypoid control ring gears 102, 104, free for rotation in the housing 12, 68, 72, as shown, and engaged with one of these ring gears is a control quadrant 106, mounted on a spindle 108, integral with a control cover 110, and in frictional engagement therewith under pressure from a spring 112. The control cover 110 has a socket 114 engaged by a ball 116 of a control lever 118 having a downward extension terminating in a ball 120 engaged in a hole 122 in the control quadrant 106.

The main shaft 24 is supported on suitable bearings 124, 126 in the housing 12 and in the driven member sleeve 64 which is in turn supported in a bearing 128 in the housing 72.

The rear housing 72 is equipped with an elevated oil reservoir 130 having a bailing slot 132 through which oil is returned to the reservoir 130 by the rotating parts.

The operation of the device is as follows:

Firstly, as to the ratio control system. When the control lever 118 is moved it rotates the control quadrant 106 which in turn rotates the engaged ring gear 104 tending to rotate the control pinions 94 and, through the forks 90, the rollers 86 about the axes of the shanks 78. Such direct rotation, however, is resisted by the heavy contact leads between the rollers 86 and the discs 26, 30 whereby initial movement of the ring gear 104 tilts the control forks 90 and the rollers 86 slightly off the true tangential relationship shown. This, in effect, steers the rollers and, due to the opposite rotation of the discs 26, 30, one side of the roller will then precess inwardly and the other outwardly so long as, and only so long as, this precession of the roller, and therefore of the pinions 94, is followed up by the ring gear 104. Whenever this ring gear is held stationary such precessional rotation of the rollers will bring the control elements 90, 94 and, therefore, the rollers themselves, back to tangential relationship and the precession will cease; the rollers being stabilized until the ring gear is next moved.

It will be seen that by disposing the pinions 94 around the supporting bosses 76 and by the concentric arrangement of the roller supporting forks 80 and the control forks 90, a very simple and compact roller control organization is afforded, this being one of the objects of the invention.

Since the pinions 94 have a compound motion of rotation and slight translation, they would not be constrained to strictly equal motion by a single control ring gear 104, but this unitary motion of the roller and control assemblages is achieved by the inclusion of the second floating control ring gear 102.

The torque-responsive loading organization functions as follows: The driven disc 30, being supported at either its inner or outer peripheries by torque-responsive rings 34—32, may be made much lighter than is permissible with discs in the prior art supported by only one torque-responsive device, and are shown much lighter, and therefore much more flexible, than the associated discs 26, 36. The roller contacts move from the inner to the outer periphery of the driven disc 30 as the ratio is changed as indicated by the dotted lines A and B in Fig. 1, and it will be apparent that the distribution of the roller contact load between the inner torque-responsive ring 34 and the outer torque-responsive ring 32 will thus vary; the entire load devolving on the inner ring in position A, on the outer ring in position B, and being equally divided between the rings in the central position shown; provided the driven plate 30 has adequate capacity for dish-wise distortion relative to the total distortion of all the parts involved in transmitting the contact loads from one disc to another, which is intended to be afforded with the proportions shown. The gross elastic yield of these parts determines the relative circumferential movement at the torque-responsive devices as the driving load, and therefore the contact pressures, are increased, and, while the disc 30 is relatively flexible for slight relative axial movement of its inner and outer peripheries, yet any arcuate element of the disc comprises a relatively short beam supported near its ends by the rings 32, 34 wherefore it is relatively rigid against beam deflections within any radial section, in spite of its relative flexibility for slight bodily angulation of diametrically opposed sections. Thus, the flexibility of the driven disc 30 does not substantially increase the relative rotational movement at the torque-responsive devices under increasing load, yet it does permit the outer periphery of the disc to advance more than the inner periphery when the contacts are near the latter. This is necessary to the functioning of this part of the invention, involving duplex torque-responsive devices as follows:

To achieve the correct relationship between the driving effort at the roller and disc contacts in spite of the large variation in the contact radii, it is necessary that the slope of the torque-responsive tracks engaging the balls 38, 40 be the same, i. e., that their helix angles be identical, but, as the outer tracks are approximately three times the diameter of the inner tracks, the helical "lead" of the outer will be three times that of the inner so that the axial advance of the outer ring 32 will be three times that of the inner ring 34 under any given rotational advance of the disc 36 due to the gross yield of the parts under an increasing load. The purpose of the dish-wise flexibility of the disc 30 is to permit this excess movement of its outer periphery when the rollers engage its inner periphery, so that, at this inner contact radius, the contact load will be controlled by the inner torque-responsive ring 34.

Where a single torque-responsive device is used, as in the prior art, the track angle thereof can be made appropriate only to one radius of roller contact, which must be the inner radius, if slippage is to be prevented. Where the radius varies in three-to-one ratio, this results in a contact pressure three times in excess of the requirement when the contact is at the outer radius. In the present invention, on the contrary, the contact pressures are divided between the inner and outer torque-responsive rings in proportion to the location of the contact points relative thereto whereby the contact pressures are maintained proportional to the driving effort at the contacts despite the change in radii thereof, in conformity with a prime object of this invention.

The ratio of diameters of the tracks 42, 46 engaging the rollers 44, is arranged to be within the ratio range of the roller contact diameters upon the driving and driven discs 26, 30 and when the last said ratio is equal to that of the tracks 42, 46 the rollers 44 are brought to zero planetary speed giving zero rotation of the coupling flange 66, regardless of the speed of rotation of the driving disc 26; similarly to the action of the toothed gears described in greater detail in said copending application. However, in this invention, the rollers 44 combine an additional and important function in that they comprise, with the race members 36, 48, the thrust bearing means whereby the contact load reactions between the relatively rotating driving and driven discs are sustained. This dual function eliminates a number of parts used in the prior art.

While I have described my invention in detail in its present preferred embodiment, it will be obvious to those skilled in the art, after understanding my invention, that various changes and modifications may be made therein without departing from the spirit or scope thereof. I aim

What is claimed is:

1. In a transmission, in combination, an annular disc elastically distortable for slight relative axial movement of its inner and outer peripheries, a roller shiftably contactable between large and small disc radii, and inner and outer torque-responsive contact loading devices effective on the disc at respective radii.

2. The combination with a roller, of a transmission disc having a radially extensive face subject to radial roller contact shift, and inner and outer torque responsive torque-transmitting means adapted to individually contact load said disc at inner and outer disc circumferences corresponding to the extremes of said contact shift thereon.

3. The combination with an annular disc, of torque-responsive devices effective at large and small radii thereon, and rollers contactable with the disc at corresponding radii, said disc being flexible so as to yield to the axial movement of one loading device when the roller contact is on that position of the disc supported by the other device.

4. The combination with an annular disc, of rollers contactable at large and small radii thereon, and torque-responsive devices acting on the disc at respective radii, said disc being sufficiently flexible so that under either contact radius condition only the corresponding torque-responsive device is effective in loading the contact.

5. In a transmission, in combination, an annular disc, rollers contactable anywhere across said annulus, and inner and outer torque-responsive means acting on the disc near respective peripheries thereof, said disc having such flexibility that the relative effectiveness of the torque-responsive devices is proportional to the position of the roller contacts on the discs relative to said devices.

6. In a transmission, in combination, an annular disc having convex and concave faces giving greatest thickness at the mid-width of the disc, torque-responsive devices respectively contacting said convex face towards the inner and outer margins thereof, and rollers variably contactable between said margins of the convex face.

7. In a transmission, in combination, an annular disc, torque-responsive devices having tracks respectively of large and small radii but of equal helix angle and contacting the back of said disc at corresponding radii, and rollers variably contactable with the front of said disc, said disc being flexible to yield under the greater axial movement characteristic of the large radius device when the roller contact is at the smaller radius.

8. In a transmission, in combination, an annular disc, torque-responsive devices effective respectively at inner and outer circumferences thereon, and rollers variably contactable with the disc between said circumferences, said disc being slightly flexible whereby the contact load is divided between said devices in proportion to the location of the contacts therebetween.

9. A transmission including, in combination, a housing, toroidal discs, rollers organized for precession therebetween, forks tiltably carrying said rollers and pressible therewith on tangential axes in said housing, control forks organized for tilting and precession with respective rollers, hypoid pinions rigid with said forks, and a control ring gear engaging all said pinions.

10. The combination with a transmission roller, of a first fork in which said roller is mounted for precession and tilting, a second fork surrounding the first and organized to control said precession and tilting, a hypoid pinion rigid with said second fork, and a control ring gear engaging said pinion.

11. The combination with transmission rollers, of roller supporting and controlling forks one embracing the other, bevel pinions rigid with said control forks, and a control ring gear engaging said pinions.

12. In a transmission, in combination, coaxial discs, a housing, bosses having bores tangentially disposed in said housing, roller carrying forks having shanks rotatable in said bores, rollers mounted for rotation with and for slight tilting in said forks, control forks fitted to the sides of said rollers and loosely embracing said carrying forks, hypoid pinions rigid with said carrying forks and loosely embracing said bosses, and a control ring gear engaging all said pinions.

13. In a transmission, in combination, an annular disc, rollers organized for shift from small to large roller contact circumferences upon the disc, two torque-responsive contact pressure means individually effective to load the disc at corresponding circumferences, and a rigid disc driving member having tracks respectively comprising one element of the respective means.

14. In a transmission, in combination, rollers, an annular disc organized for shift from small to large roller contact circumferences upon the disc, and torque-responsive contact pressure means individually effective to load the disc at corresponding circumferences, said disc being flexible for slight axial advance at one circumference when the contacts are at the other.

ROLAND CHILTON.